（12）United States Patent
Raulot

(10) Patent No.: US 10,310,619 B2
(45) Date of Patent: Jun. 4, 2019

(54) USER GESTURE RECOGNITION

(71) Applicant: Artnolens SA, Foetz (LU)

(72) Inventor: Olivier Raulot, Longeville-les-Metz (FR)

(73) Assignee: Artnolens SA, Foetz (LU)

( * ) Notice: Subject to any disclaimer, the term of this patent is extended or adjusted under 35 U.S.C. 154(b) by 0 days.

(21) Appl. No.: 15/128,074

(22) PCT Filed: Mar. 5, 2015

(86) PCT No.: PCT/EP2015/054673
§ 371 (c)(1),
(2) Date: Sep. 21, 2016

(87) PCT Pub. No.: WO2015/139969
PCT Pub. Date: Sep. 24, 2015

(65) Prior Publication Data
US 2017/0090586 A1    Mar. 30, 2017

(30) Foreign Application Priority Data

Mar. 21, 2014 (LU) .......................................... 92408

(51) Int. Cl.
*G06F 3/01* (2006.01)
*G06F 3/0484* (2013.01)
(Continued)

(52) U.S. Cl.
CPC ............ *G06F 3/017* (2013.01); *G06F 3/0485* (2013.01); *G06F 3/04842* (2013.01); *G06F 3/005* (2013.01); *G06F 2203/04803* (2013.01)

(58) Field of Classification Search
CPC ...... G06F 3/017; G06F 3/0425; G06F 3/0428; G06F 3/042; G06F 3/0304; G06F 3/0488;
(Continued)

(56) References Cited

U.S. PATENT DOCUMENTS 6,803,906 B1    10/2004  Morrison et al.
9,552,105 B2 *   1/2017  Shim .................... G06F 3/0428
(Continued)

FOREIGN PATENT DOCUMENTS

| JP | 5-189137 A | 7/1993 |
| JP | 2008-210348 A | 9/2008 |
| WO | 2011/054740 | 5/2011 |

OTHER PUBLICATIONS

International Search Report for PCT/EP2015/054673 dated Feb. 11, 2016, 3 pages.

*Primary Examiner* — Sanjiv D. Patel
(74) *Attorney, Agent, or Firm* — Seed Intellectual Property Law Group LLP

(57) ABSTRACT

A method and device for gesture recognition, wherein the gesture is executed by a user in a gesture region which may be defined relative to a display surface. In an embodiment, the gesture comprises a select gesture and the device comprises at least three cameras operating in the visual range where a first camera is used to determine a horizontal location of the select gesture and the other cameras are used to determine a vertical location thereof. A device for providing input to a computing device comprises a rectangular display having a viewing surface and at least three cameras having respective fields of view. A first camera and a second camera are located at respective adjacent corners of the display and a third camera is located at an edge of the display between the first and second cameras.

28 Claims, 9 Drawing Sheets

(51) Int. Cl.
*G06F 3/0485* (2013.01)
*G06F 3/00* (2006.01)

(58) Field of Classification Search
CPC ......... G06F 3/0416; G06F 2203/04104; G06F 3/005
See application file for complete search history.

(56) References Cited

U.S. PATENT DOCUMENTS

| | | | | |
|---|---|---|---|---|
| 2003/0178556 A1* | 9/2003 | Tachi | ...................... | G01L 1/247 250/227.11 |
| 2005/0077452 A1* | 4/2005 | Morrison | .............. | G06F 3/0428 250/221 |
| 2006/0139314 A1* | 6/2006 | Bell | ........................ | A63F 13/02 345/156 |
| 2008/0158146 A1* | 7/2008 | Westerman | ........ | G06K 9/00375 345/156 |
| 2009/0195505 A1* | 8/2009 | Chen | ...................... | G06F 1/3203 345/166 |
| 2011/0267264 A1* | 11/2011 | McCarthy | ................ | G06F 3/017 345/157 |
| 2012/0007804 A1* | 1/2012 | Morrison | ................ | G06F 3/005 345/158 |
| 2012/0013529 A1* | 1/2012 | McGibney | ............ | G06F 3/0425 345/156 |
| 2012/0274765 A1* | 11/2012 | Ung | ....................... | G06F 3/0428 348/143 |
| 2013/0055143 A1* | 2/2013 | Martin | .................. | G06F 3/0425 715/779 |
| 2013/0088461 A1* | 4/2013 | Shamaie | ................. | G03B 21/14 345/175 |
| 2013/0241883 A1* | 9/2013 | Leung | ................... | G06F 3/0425 345/175 |
| 2015/0097811 A1* | 4/2015 | Wei | ......................... | G06F 3/042 345/175 |

* cited by examiner

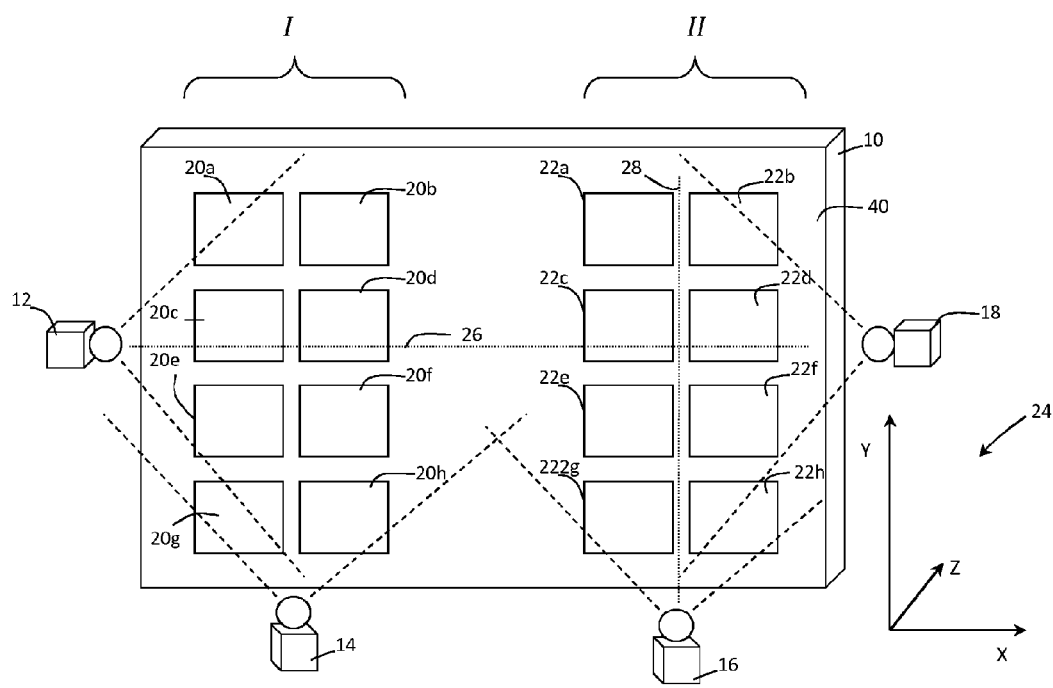
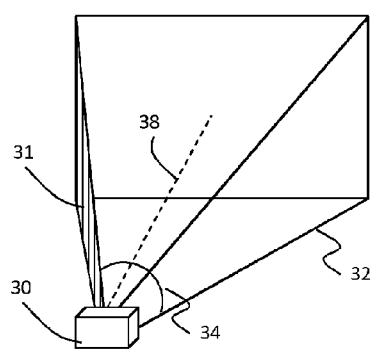
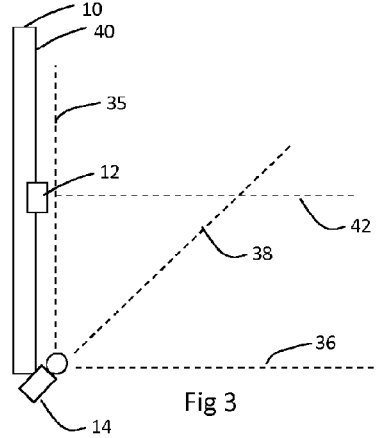
Fig 1
Fig 2
Fig 3

USER GESTURE RECOGNITION

BACKGROUND

Technical Field

Embodiments of the present disclosure relate to a system and method for recognizing user gestures and interpreting these as commands for a computing device.

Description of the Related Art

There is growing desire to allow users to interact with computing devices without the need for the direct manipulation of a hardware device. By providing appropriate user gesture and action recognition, a combination of computer hardware and software is able to interpret the movements of a user as input in such a manner that the user is able to control the computing device without directly manipulating hardware.

For example, gaming consoles such as the Xbox 360® and the Nintendo Wii® are able to interpret user gestures as user input to allow control of these devices by gesture alone. The Nintendo Wii® makes use of the hand-held controller referred to as the Wii-remote. The Xbox 360® makes use of the Kinect® hardware add-on to allow for gesture recognition. The Wii-remote requires the manipulation of hardware in that a user is required to move the remote to interact with the computing device.

The Kinect system used with the Xbox 360® provides for a combination of an RGB and an infra-red camera. Although the manner in which this system operates is not public, the need for relying on an infra-red camera suffers from a number of disadvantages such as, for example, the inability to interpret information in different ambient light conditions, such as for example an outdoor environment.

All of the prior art gesture recognition systems and software suffer from the disadvantage that they process all, or substantially all, of the information captured. This results in the need to process significant amounts of irrelevant information thereby slowing down the processing time required.

Furthermore, prior art systems require significant calibration calculations which interfere with a user's experience as the user must first allow the system to calibrate before being able to use the system.

BRIEF SUMMARY

A first aspect of the present disclosure extends to a method of providing input to a computing device, the computing device comprising a processor, memory, a display having a viewing surface and at least three cameras having respective fields of view, the method comprising the steps of:
 capturing corresponding images with the cameras;
 identifying input gestures using the captured images; and
 interpreting the identified gestures as input to the computing device; wherein
 at least one of the cameras is orientated such that the respective field of view lies adjacent to the viewing surface of the display; and wherein
 identifying input gestures in the captured images comprises choosing between images captured by either a first camera or a second camera and further using the chosen images to identify input gestures.

Identifying input gestures in the captured images may be further based on images captured by a third camera.

Choosing between images captured by either the first camera or the second camera may comprise comparing information between images captured by the first camera and images captured by the second camera.

Comparing information may comprise comparing a standard deviation of information contained in an image captured by the first camera to a standard deviation of information contained in an image captured by the second camera.

Determination of a first dimension for use in identifying input gestures may be based on images captured by the third camera. The first dimension may be a horizontal position relative to the display and may relate to an X co-ordinate.

The input gesture may be recognized by determining a change in images captured by the first camera at different times and calculating a threshold based on the change.

Determination of a second dimension for use in identifying input gestures may be based on images captured by the first camera or the second camera. The second dimension may be a vertical position relative to the display and may relate to a Y co-ordinate which is orthogonal to the X co-ordinate.

When the input gesture is performed by a user's appendage, the step of determining the second dimension of the input gesture may comprise recognizing the user's appendage. In particular, the user's appendage may be recognized according to a predetermined range of hue, saturation and value of pixels in images captured by the second camera.

The method may further comprise establishing a mapping between a co-ordinate system of the first camera and/or the second camera and a co-ordinate system of the viewing surface.

The mapping may comprise a linear mapping.

The mapping comprises a first linear mapping applied to a first section of the co-ordinates of the viewing surface and a second linear mapping applied to a second section of the viewing surface.

The method may further comprise processing each image by designating a region of the image as a gesture region and determining changes in the gesture region.

The method may further comprise defining respective gesture regions adjacent to the viewing surface of the display. The gesture regions may be spaced from the viewing surface of the display.

The method may further comprise tracking the input gesture and determining a slide action in dependence on detected motion of the input gesture.

At least one of the cameras may be orientated so that the respective fields of view lie adjacent to the viewing surface of the display. Two or more of the cameras may be orientated so that their respective fields of view lie adjacent to the viewing surface of the display.

All of the cameras may be situated near an edge of the display and may be orientated with intersecting fields of view.

The computing device may further comprise a fourth camera which is positioned adjacent the third camera and, in this case, a determination of a first dimension may comprise choosing between images captured by the third camera and images captured by the fourth camera. The third and the fourth camera may be positioned adjacent one another relative to a length of the display. The computing device may comprise five cameras: two corner cameras and three edge cameras.

A further aspect of the present disclosure extends to a method of translating a measurement made in an image captured by a camera to a position on a viewing surface of a rectangular display where the camera is orientated at an angle with respect to the display, said method comprising establishing a mapping between a co-ordinate system of the camera and a co-ordinate system of the viewing surface.

The mapping may comprise a linear mapping.

The mapping may comprise a first linear mapping applied to a first section of the co-ordinates of the viewing surface and a second linear mapping applied to a second section of the viewing surface.

The first and second section may correspond to vertical sections of the viewing surface.

The first and second sections may each correspond to substantially half of a vertical extent of the viewing surface.

A further aspect of the present disclosure extends to a device for providing input to a computing device, the computing device comprising a processor and memory, the device comprising a rectangular display having a viewing surface defining a plane and at least three cameras having respective fields of view, wherein a first camera and a second camera are located at respective adjacent corners of the display and a third camera is located at an edge of the display between the first and second cameras.

The display may be a monitor or a surface onto which an image is being projected. The cameras may be sensitive to light in the visual range only. The cameras mounted at the corners of the display may be orientated towards an opposing corner.

The device may further comprise a fourth camera located at an edge of the display between the first and second cameras. A fifth camera may be located at an edge of the display between the first and second cameras.

The device may further comprise a mounting frame located at a periphery of the display so that at least said first and second camera are mounted to the mounting frame. Each of the cameras may be mounted to the mounting frame.

At least one of the cameras may be orientated such that the respective field of view lies adjacent to the viewing surface of the display. All of the cameras may be orientated so that the fields of view of the first and second camera intersect one another.

The input may comprise one or more input gestures and, in this case, the memory stores instructions which, when processed by the processor, identify one or more input gestures using the captured images, wherein identifying input gestures in the captured images may comprise choosing between images captured by either a first camera or a second camera and further using the chosen image to identify input gestures.

Identifying input gestures in the captured images may be further based on images captured by a third camera.

Choosing between images captured by either a first camera or a second camera may comprise comparing information between images captured by the first camera and images captured by the second camera.

The input gesture may be performed by a user's appendage and the instructions for determining the second dimension of the input gesture may comprise instructions for recognizing the user's appendage.

The user's appendage may be recognized according to a predetermined range of hue, saturation and value of pixels in images captured by one or more of the cameras. The user's appendage may be recognized according to a predetermined range of hue, saturation and value of pixels in images captured by the third camera.

The instructions, when processed by the processor may carry out the method herein described.

At least one of the cameras may be orientated so that the respective fields of view lie adjacent to the viewing surface of the display.

All cameras may be situated near an edge of the display and orientated with intersecting fields of view.

The method of providing input to a computing device may further comprise dividing a viewing surface of the display into a plurality of types of gesture regions and designating each type of gesture region for a particular gesture. The method may comprise designating a select gesture region type. The method may further comprise designating a scroll region type.

A further aspect of the present disclosure extends to a method of providing input to a computing device, the computing device comprising a processor, memory, a display having a viewing surface and at least two cameras having respective fields of view, the method comprising the steps of:

capturing corresponding images with both cameras;
identifying input gestures in the captured images;
interpreting the identified gestures as input to the computing device; wherein
at least one of the cameras is orientated such that the respective field of view lies adjacent to the viewing surface of the display.

The gesture may correspond to a selection and/or a scroll.

Both cameras may be orientated so that the respective fields of view lie adjacent to the viewing surface of the display.

Both cameras may be situated near an edge of the display and orientated with intersecting fields of view.

Preferably, the fields of view do not extend orthogonally away from, or towards, the display. The fields of view may extend in a direction adjacent to the viewing surface. The fields of view may be orientated so that a side of the field of view closest to the display runs substantially parallel to the display.

Preferably the first camera is orientated vertically and the second camera is orientated horizontally. The display may have a landscape orientation.

The cameras may be situated with respective optical axes intersecting one another. In certain embodiments, the optical axes of the cameras intersect so that respective projections of the optical axes onto the viewing surface of the display intersect at an angle between 60 and 120°. Preferably, the angle may be 90°.

A first camera may be used to determine a first dimension of the input gesture.

The input gesture may be recognized by determining a change in images captured by the first camera at different times and calculating a threshold based on the change.

A second camera may be used to determine a second dimension of the input gesture.

Preferably the first camera is orientated vertically and the second camera is orientated horizontally. The display may have a landscape orientation. As used, the terms "vertical" and "horizontal" apply to the landscape orientation of the display.

The input gesture may be performed by a user's appendage and the step of determining the second dimension of the input gesture may comprise recognizing the user's appendage.

The user's appendage may be recognized according to a predetermined range of hue, saturation and value of pixels in images captured by the second camera.

The method may further comprise processing each image by designating a region of the image as a gesture region and determining changes in the gesture region.

Respective gesture regions may be defined in images captured by each camera adjacent to the viewing surface of the display.

The gesture regions may be spaced from the viewing surface of the display. In an embodiment, the gesture regions are spaced by less than 5 cm from the viewing surface of the display. In further embodiments, the gesture regions are between 5 and 10 cm away from the viewing surface of the display. In a further embodiment, the distance is approximately 5 cm or 10 cm. The fields of view of the cameras may be spaced by a similar distance from the viewing surface of the display as the gesture regions.

By providing for a space between the gesture regions and the display, embodiments of the present disclosure are able to accommodate an object such as a window between the user and the display. This is useful where the display may, for example, be presented in a shop window, and the user is standing outside.

The method may further comprise tracking the input gesture and determining a slide action in dependence on detected motion of the input gesture.

The method may further comprise orientating the first camera along a vertical axis and orientating the second camera along a horizontal axis wherein the first dimension is a horizontal position of the gesture and the second dimension is a vertical position of the gesture.

The method may further comprise providing a third camera which is orientated along the horizontal axis wherein the determination of the horizontal position may be used to determine which of the cameras orientated along the horizontal axis is to be used to determine the vertical position of the gesture.

The method may comprise defining two types of gesture regions: a first gesture region for gestures relating to select gestures and a second gesture region for gestures relating to slide actions. In these embodiments, the user will perform select gestures in a predefined area in front of the display and slide gestures in a different predefined area in front of the display.

A further aspect of the present disclosure extends to a device for providing input to a computing device, the computing device comprising a processor and memory, the device comprising a display having a viewing surface defining a plane and at least two cameras having respective fields of view, wherein at least one of the cameras is orientated such that the respective field of view lies adjacent to the plane.

A further aspect of the present disclosure extends to a device for providing input to a computing device, the computing device comprising a processor, memory and a display having a viewing surface, the device comprising a mounting frame and at least two cameras having respective fields of view, the cameras being attached to the mounting frame, and the mounting frame defining a plane for the viewing surface of the display, wherein at least one of the cameras is attached to the mounting frame such that the respective field of view lies adjacent to the plane.

Both cameras may be orientated so that the respective fields of view lie adjacent to the plane.

Both cameras may be situated near an edge of the plane and orientated with intersecting fields of view.

The cameras may be situated with respective optical axes intersecting one another. In certain embodiments, the optical axes of the cameras intersect so that respective projections of the optical axes onto the viewing surface of the display intersect at an angle between 60 and 150°. Preferably, the angle may be between 80° and 100°.

The device may comprise the computing device.

The input may comprise an input gesture and the memory may store instructions which, when processed by the processor, cause a first camera to determine a first dimension of the input gesture.

The input gesture may be recognized by determining a change in images captured by the first camera at different times and calculating a threshold based on the change.

The device may comprise a second camera wherein the memory stores instructions to determine a second dimension of the input gesture based on images captured by the second camera.

The input gesture may be performed by a user's appendage and the instructions for determining the second dimension of the input gesture may comprise instructions for recognizing the user's appendage.

The user's appendage may be recognized according to a predetermined range of hue, saturation and value of pixels in images captured by the second camera.

The device may further comprise instructions for designating a region of the image as a gesture region and determining changes in the gesture region.

The device may further comprise instructions for defining respective gesture regions adjacent to the plane.

The gesture regions may be spaced from the plane. In an embodiment, the gesture regions are spaced by less than 5 cm from the plane. In further embodiments, the gesture regions are between 5 and 10 cm away from the plane. In a further embodiment, the distance is approximately 5 cm or 10 cm. In further embodiments, the cameras may be orientated relative to the mounting frame so that their fields of view are spaced from the plane. In embodiments the fields of view are between 5 and 10 cm away from the plane. In a further embodiment, the distance is approximately 5 cm or 10 cm.

The device may further comprise instructions for tracking the input gesture and determining a slide action in dependence on detected motion of the input gesture.

Preferably the first camera is orientated vertically and the second camera is orientated horizontally. The mounting frame may have a landscape orientation.

In an embodiment, the device comprises two cameras with horizontal orientations and two cameras with vertical orientations, wherein the cameras with horizontal orientations are located on opposite sides of the plane, whereas the cameras with vertical orientation are located on the same side of the plane.

The device may comprise instructions to remove overlapping fields of view from the cameras with vertical orientation.

The device may further comprise a plurality of cameras orientated along a vertical axis and a plurality of cameras orientated along a horizontal axis, and wherein at least two of the cameras orientated along the horizontal axis may be orientated in opposing directions.

A further aspect of the present disclosure relates to a method of providing input to a computing device based on a user's gesture, the gesture occurring in a gesture region having a horizontal and a vertical axis, the method comprising:
   providing at least two cameras with corresponding field of views;
   orientating the first camera with its field of view orientated substantially along the vertical axis;
   orientating the second camera with its field of view orientated substantially along the horizontal axis;

determining a horizontal position of the gesture based on images captured by the first camera;

determining a vertical position of the gesture based on images captured by the second camera;

providing input to the computing device based on the determined horizontal positions.

The input to the computing device may correspond to a select action or to a scroll action.

The cameras may capture images in a visual spectrum.

The method may further comprise providing a third camera orientated along the horizontal axis, wherein the determination of the horizontal position is used to determine which of the cameras orientated along the horizontal is to be used to determine the vertical position of the gesture.

The third camera may be used to verify the presence of a gesture in a gesture region. In embodiments of the present disclosure, the third camera is then used to determine that the gesture has occurred in a predetermined space. This helps to eliminate movements which are not attributable to a user's appendage and which were not intended as a gesture (such as movement of a user's head). This applies to the aforementioned aspects of the present disclosure too.

A further aspect of the present disclosure relates to a device of providing input to a computing device based on a user's gesture, the gesture occurring in a gesture region having a horizontal and a vertical axis, the device comprising:

at least two cameras with corresponding field of views;

wherein the first camera is orientated with its field of view substantially along the vertical axis;

the second camera is orientated with its field of view substantially along the horizontal axis;

the device being adapted to determine a horizontal position of the gesture based on images captured by the first camera;

determine a vertical position of the gesture based on images captured by the second camera; and provide input to the computing device based on the determined horizontal positions.

BRIEF DESCRIPTION OF THE SEVERAL VIEWS OF THE DRAWINGS

Embodiments of the present disclosure are described with reference to the accompanying schematic diagrams where:

FIG. 1 is a schematic illustration of a display and cameras arranged and used in accordance with embodiments of the disclosure;

FIG. 2 illustrates a camera and corresponding field of view;

FIG. 3 is a side view of the display and cameras of FIG. 1;

DETAILED DESCRIPTION

Figure 4:
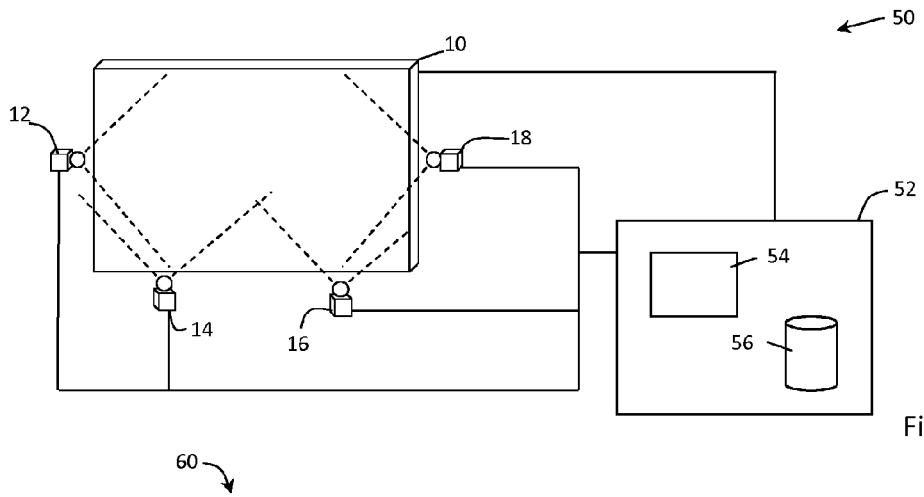
FIG. 4 is a schematic illustration of a display, cameras and computing device.

FIG. 1 illustrates a display 10 and four cameras 12, 14, 16 and 18. Each of the cameras are shown with their field of views illustrated in dashed outline. Cameras 12 and 18 are orientated so that their field of views include the horizontal extent of the display 10 whereas cameras 14 and 16 are orientated so that their field of views include the vertical extent of the display 10. The orientations of the cameras and how this affects the field of views is described below in greater detail.

The display is divided into 16 virtual buttons 20a, 20b, 20c, . . . , 20h and 22a, 22b, 22c, . . . , 22h. The virtual buttons 20 constitute column I of the buttons, and virtual buttons 22 constitute column II of the buttons. A set of co-ordinate axes 24 illustrate X, Y and Z axes relative to the display 10. As illustrated, the columns I and II of virtual buttons 20 and 22 are arranged along the X axis.

The cameras 12, 14, 16 and 18 are orientated so that camera 12 with a horizontal orientation (i.e., along the X-axis) and camera 16 with a vertical orientation (i.e., along the Y-axis) are used to monitor the virtual buttons 22 of column II. Likewise camera 18 with horizontal orientation and camera 14 with vertical orientation are used to monitor the virtual buttons 20 of column I. The cameras with horizontal orientation, cameras 12 and 18, are used to monitor the column of virtual buttons on the opposite side of the display 10 to ensure that the fields of view of the cameras extend over all of the virtual buttons of the column concerned.

In this embodiment, the cameras 12, 14, 16 and 18 capture images from the visual band of the electromagnetic spectrum. The advantage of this is that such cameras are readily available and are therefore relatively cheap and easy to work with. Furthermore, cameras which operate in the visual band have the advantage that they can be used in a wide variety of ambient lighting conditions. Therefore, embodiments of the present disclosure are useable both indoors and outdoors in direct sunlight.

In this embodiment, the cameras 12, 14, 16 and 18 have a resolution of 640×480 pixels and a horizontal field of view of 72° and measurements and specific threshold and other values given depend on this resolution and field of view. It is to be realized that different cameras with different resolutions may be used instead, in which case the dependent values mentioned below will be altered.

FIG. 2 illustrates a camera 30 of the same type as cameras 12, 14, 16 and 18. As illustrated, the camera 30 has a field of view 32 which represents the scene visible to the camera 30. If there are no obstacles, this field of view is a cone, as illustrated, with its apex at the lens (not shown) of the camera 30. An optical axis 38 extends from the lens of the camera to the center of the field of view 32, as illustrated. In this embodiment, the horizontal angle 34 subtended by the field of view 32 is 72°.

The field of view 32 illustrated in FIG. 2 has a side 31. The side 31 is the left-hand side in this embodiment, but it is to be realized that other sides may be used in embodiments of the present disclosure.

In embodiments of the present disclosure, the orientations of the cameras are important. FIG. 3 illustrates a side view of the display 10 and camera 12 of FIG. 1. The display 10 has a viewing surface 40. This is the surface on which image information is visible to a user during use of the display 10. As illustrated, the camera 12 has a field of view denoted by dashed lines 35 and 36, and an optical axis 38. The dashed line 35 corresponds to the side 31 of FIG. 2. The camera 12 is orientated so that the field of view 36 lies adjacent to the viewing surface 40 of the display 10. In this embodiment, the dashed line 35 (and therefore the side 31 of the field of view) lies substantially parallel to the viewing surface 40 of display 10.

In further embodiments, as described below, the camera may be orientated so that there is an increased space between the field of view and the viewing surface. It will be realized that under these circumstances, where the camera remains fixed in the position indicated in FIG. 3, the dashed line 35 will describe an angle relative to the viewing surface of the display.

In certain embodiments, the field of view does not include the viewing surface of display. The angle between the side of the field of view and the viewing surface may be less than 15°.

The advantage of having the field of view of the camera 12 lie adjacent to the viewing surface of the display is that this avoids the capture of reflections in the surface of the display 10 which would add significant complications to the calculations which are performed.

As described in further detail below, the area in front of the display which is used to recognize gestures can lie adjacent the display, or may be spaced from the display in the direction of the X-axis. It is to be realized therefore, although the field of view of the camera 12 lies adjacent to the viewing surface 40 of the display 12, it may additionally be spaced therefrom. In an embodiment, the maximum distance between the field of view 36 and the viewing surface is 15 cm. In a further embodiment, the distance between the viewing surface and the field of view is between 5 and 10 cm. In a further embodiment, the distance is approximately 5 cm or 10 cm.

The camera 14 illustrated in FIGS. 1 and 3 is shown with 90° field of view in both FIG. 1 and FIG. 3. However, it is to be realized that cameras with larger, or smaller, fields of view may be used instead.

The above discussion regarding the orientation of camera 14 applies equally to the orientation of the cameras 12, 16 and 18. Camera 12 is illustrated in FIG. 3. Camera 12 has an optical axis denoted by dashed line 42. As can be seen from FIG. 1, the projection 26 of the optical axis 42 of camera 12 onto the viewing surface 40 of display 10 intersects the projection 28 of the optical axis of camera 16 onto the viewing surface 40 of display 10 at an angle which is here 90°. It has been found that the angle of intersection may be between 60 and 120°, but a right angle is preferable in that it simplifies the calculations involved.

In embodiments, it is important that the fields of view of the cameras overlap as this allows for error correction. This is described in further detail below and applies to the horizontal camera 12 and 18. Overlap of the fields of view of the vertical cameras, 14 and 16 is less useful. In this embodiment, this overlap in the fields of view of the vertical cameras will be ignored by only using the images from camera 16 for that area.

Although camera 18 is used together with camera 14, as described below, it is to be realized that the orientation of camera 18 is the mirror image of that of camera 12 and therefore, the optical axes of cameras 14 and 16 will overlap.

FIG. 4 illustrates a device 50 according to an embodiment of the present disclosure. The device 50 comprises the display 10 and cameras 12, 14, 16 and 18 illustrated in FIGS. 1 and 3. The display 10 and the cameras 12, 14, 16 and 18, are connected to a computing device 52. The computing device 52 comprises a processor 54 and memory 56. The memory 56 contains instructions which, when processed by the processor 54 cause the computing device 52 to carry out certain calculations and decisions.

A process of recognizing the gesture of a user as carried out by the computing device 52 of the device will be described with reference to FIG. 5. For the purposes of this discussion, reference is made to cameras 12 and 16, but it is to be realized that the process may apply to other camera pairs too.

Figure 5:
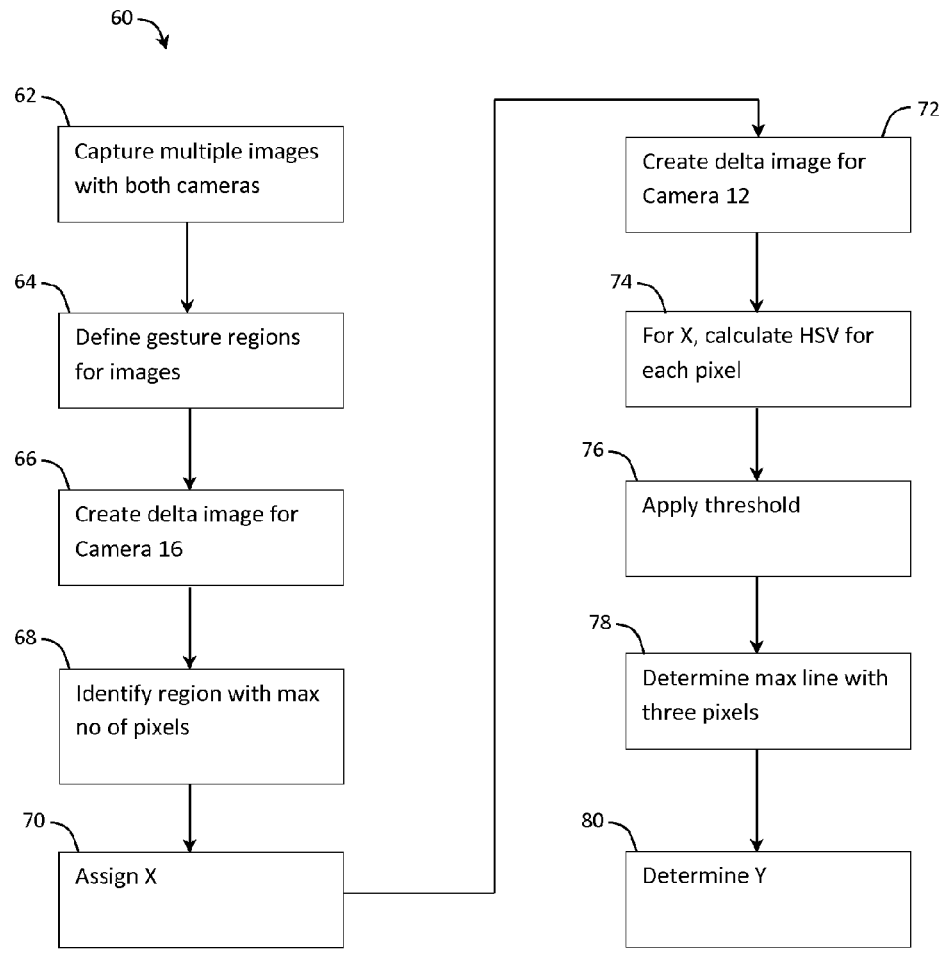
FIG. 5 is a flow diagram of a method according to an embodiment of the disclosure.
Figure 7:
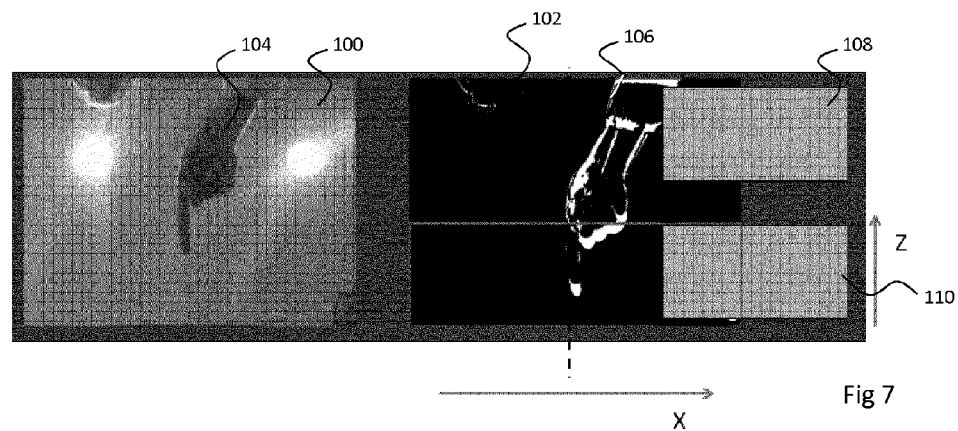
FIGS. 7 and 8 are images captured by respective cameras with overlays.

FIG. 5 illustrates a process 60 of interpreting or recognizing a user's gesture as input to the computing device 52. At the initial step, step 62, the cameras 12 and 16 capture images at successive times and these images are stored in the memory 56 of the computing device 52 of FIG. 4. FIG. 7 illustrates an image 100 captured by camera 16. In the co-ordinate system 24 of FIG. 1, the image is a view along the Y-axis. As shown, a user's hand 104 with a finger extended as a gesture is captured in the image 100.

Also illustrated in FIG. 7 is representation 102 showing the results of obtaining a difference image between two images such as image 100 taken at different times. Rectangle 108 defines a gesture region which is a portion of the field of view of the camera which is designated as the area in which gestures are recognized. In other words, the calculations as described herein are only carried out for the image defined in the gesture region 108. Therefore, it is not necessary for the computing device to carry out calculations for all of the information in the image. Making calculations for such a reduced area provides significant advantages in terms of processing speed over an implementation where the entire image is to be processed.

Also illustrated in FIG. 7 are virtual buttons 108 and 110, which correspond to two of the virtual buttons 20 and 22 shown in FIG. 1. The virtual buttons 108 and 110 are shown superimposed here on the captured image to illustrate the relative sizes, but the present disclosure is not limited in this respect.

Figure 8:
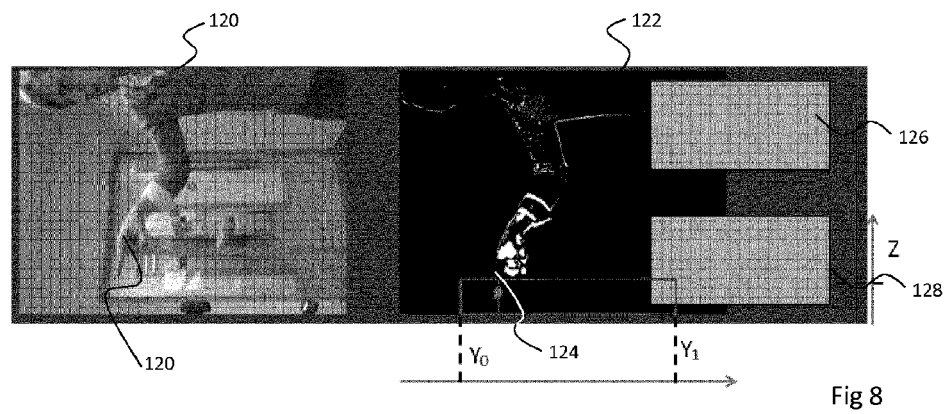

FIG. 8 illustrates an image 120 captured by camera 12. The image 120 corresponds to the same scene as image 100 and, as shown, the user's hand 104 with extended finger is also visible in image 120. Also shown in FIG. 8 is representation 122 showing a difference between successive images such as image 120. Also illustrated is rectangle 124 defining the gesture region 124. Gesture region 124 is similar to gesture region 108 of FIG. 7 in that it delineates a sub-area of the captured images for which calculations are carried out.

Also illustrated in FIG. 8 are virtual buttons 126 and 128 superimposed as an indicator of relative sizes for this embodiment.

In an alternative embodiment, the rectangles 108, 110, 126 and 128 correspond to predetermined depth indicators where one of the cameras 176, 177 or 178 monitor the depth (i.e., extent in the Z co-ordinate) of pixels found in difference images, and only when a presence is detected in rectangle 108 or 126 is the remainder of the identification process initiated.

Referring back to FIG. 5, at step 64, the gesture regions 108 and 124 are defined for each of the images captured at step 62, in accordance with the camera involved in the capture (i.e., region 108 is defined for images captured by camera 16 and region 124 for images captured by camera 12).

At the following step, step 66, difference (or delta) images are calculated for successive images captured by camera 16. The result of such a calculation is shown as representation 102 of FIG. 7. Where a difference between the two images is calculated, a white pixel is shown in the representation 102. As shown, this process results in the background from all of the images being removed, and only the user's hand being shown (since this has moved between successive images).

In the following step, step 68, of the process of FIG. 5, the region in the image with the greatest number of pixels is determined. With reference to FIG. 1, it can be seen that camera 16 has all of virtual buttons 22a, 22b, 22c, . . . , 22h in its field of view. However, virtual buttons 22a, 22c, 22e and 22g form one of the columns whereas virtual buttons 22b, 22d, 22f and 22h form another of the columns.

The processor therefore divides the images captured by camera 16 into two halves, each corresponding to one of the columns of the virtual buttons 22. By determining in which of the halves the most number of pixels in the difference image occur, a determination of the X-axis co-ordinate (or dimension) of the gesture can be made.

To ensure that minor movements in the camera's field of view are not mistakenly tagged as a gesture, the processor will only recognize a gesture where there are 2 000 pixels or more in the predefined region (i.e., X-axis co-ordinates) corresponding to a column of virtual buttons. It is to be realized that the actual amount of the number of pixels used as the threshold in this regard may vary and may depend on a number of factors such as the resolution of the camera involved.

With reference to FIG. 5, in step 70, the X-axis co-ordinate is assigned based on the process described above. It is to be realized that where there is more than one horizontal camera, then the determination of step 70 may be used to select the horizontal camera covering that area in which the gesture has been detected.

In the following step, step 72, the difference image is calculated for the images captured by camera 12. Representation 122 of FIG. 8 illustrates the result of such a calculation where the white pixels of this representation illustrate differences between successive images.

At step 74 of FIG. 5, the hue, saturation and value (HSV) is calculated for each of the pixels identified in the difference image of step 72. At the following step, step 76, a threshold for the HSV is applied. In this step, any pixels in the original image corresponding to the pixels of the difference image which do not have an HSV falling within the predetermined threshold are ignored. This is done to exclude any moving objects which have different color to skin tones to exclude any objects which are not a user's hand (or other appendage).

In further embodiments of the present disclosure, the HSV threshold may be chosen to select input devices other than a naked appendage. However, in embodiments, it is useful to use such a HSV threshold to exclude false positive results. This is particularly so where users are using appendages as input devices due to the relative distinctive nature of skin tones. The particular HSV applied to for the threshold will depend on the user demographic concerned. The manner in which this is done is known in the art and will not be further described here.

In an embodiment, the HSV is calculated not only for each pixel identified in the difference image determined at step 72, but also for all pixels lying within a range of 20 pixels on the X-axis. In other words, if the location of a pixel in the difference image is given by (x, y), then the HSV threshold is determined for all pixels lying between (x−10, y) and (x+10, y).

In an embodiment, the HSV threshold determination is limited to only those pixels falling within the gesture region.

Once the pixels which do not meet the HSV threshold have been excluded in step 76, the process 60 of FIG. 5 moves on to step 78 where the maximum line with at least three pixels is identified. This step involves analyzing the pixels remaining to determine which of those lie in the same column (with reference to the representation 122 of FIG. 8) in the gesture region 124 and, of those, which of them have the Z co-ordinate lying closest to the edge of gesture region 124 lying closest to the viewing surface of the display (not shown in this Figure).

It is then assumed that the line which meets these criteria represent the user's appendage (in the example illustrated, the user's finger). The position along the Y-axis of the line so determined is then taken as the position of the gesture, at step 80 (this is also referred to as establishing one of the dimensions of the gestures, in this case the dimension in the Y-axis). In this embodiment, an overall threshold of 15 pixels is applied. In other words if there are fewer than 15 pixels which have passed the HSV threshold test in the gesture region 124, no gesture is recognized, and the process will begin again.

In this manner, the user's gesture has been ascribed an X and a Y co-ordinate (or dimension), and these two co-ordinates will allow the processor to choose the closest virtual button corresponding to that position. It is an advantage that the gesture recognition of this embodiment is limited to recognizing a select gesture which corresponds to a user pointing at a portion of the display (or, as explained above, the gesture region). This limitation significantly reduces the calculations required and allows for gestures which do not correspond in position to one of the virtual buttons to be ignored.

In further embodiments of the present disclosure, a user's gesture may be recognized as a select gesture (such as a user pointing at the display discussed above) or as a movement gesture.

Figure 6:
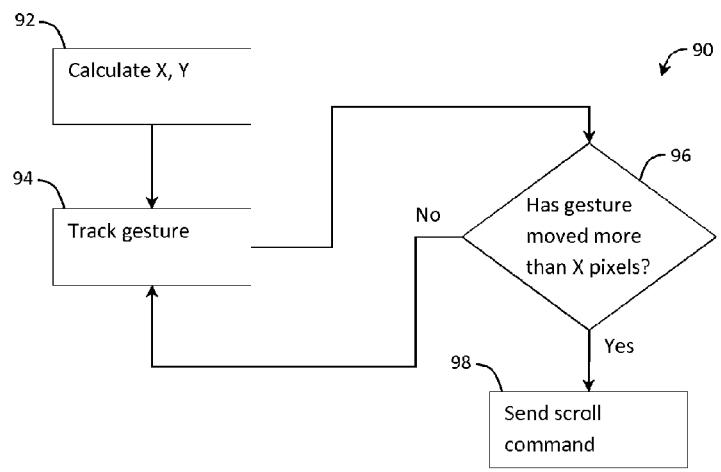
FIG. 6 is a flow diagram of a method according to an embodiment of the disclosure.

FIG. 6 illustrates a process 90 whereby a user gesture may be recognized as a movement gesture. In the first step 92, the X and Y co-ordinates of the user's appendage are calculated in the same manner as previously described with reference to FIG. 5.

In the following step, step 94, the gesture which was recognized in step 92 is tracked. This involves monitoring images taken at successive times and calculating the difference in the Y co-ordinate for the gesture recognized in these successive images.

In step 96 a determination is made whether the Y co-ordinate has changed more than a predetermined number of pixels. In the embodiment illustrated, the predetermined number of pixels is set to 250. However, in further embodiments, this amount will be higher or lower depending on the resolution of the cameras concerned and the desired sensitivity of the gesture, among others.

If the threshold is not met at step 96, the process will return to step 94. However, if the threshold is passed at step 96, a determination will be made that a slide gesture is recognized and the appropriate command will be sent. In this embodiment, the slide gesture corresponds to a scroll command.

In those embodiments of the present disclosure where both select and scroll gestures are interpreted, the display surface may have a column (such as column I of the display 10 of FIG. 1) which is reserved for scroll gestures. This reduces the chances that different types of gestures will be confused for one another.

Embodiments of the present disclosure operate by using two cameras to interpret a user's gesture as input to a computer device. One of the advantages of embodiments is that no calibration step is required for the user. Although it is necessary to ensure that the cameras have the desired orientation relative to the display, once this has been set up, there are no further calibration steps required. In particular, this is an advantage for a user where there is no requirement to wait before the device may be used. Certain prior art systems suffer from the disadvantage that each use requires a laborious and time-consuming calibration step.

Figure 9:
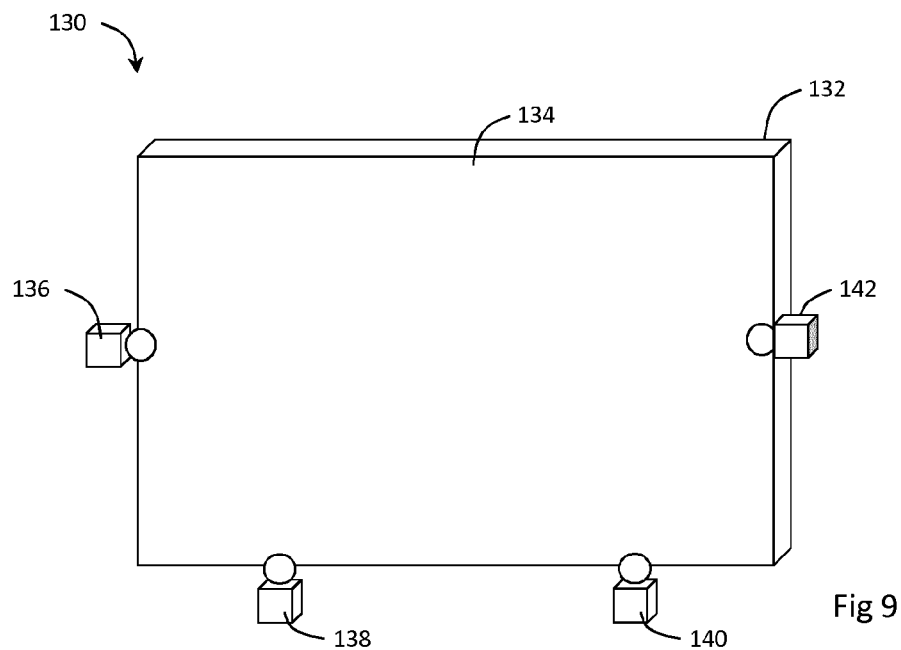
FIG. 9 illustrates a device according to an embodiment of the disclosure.
Figure 10:
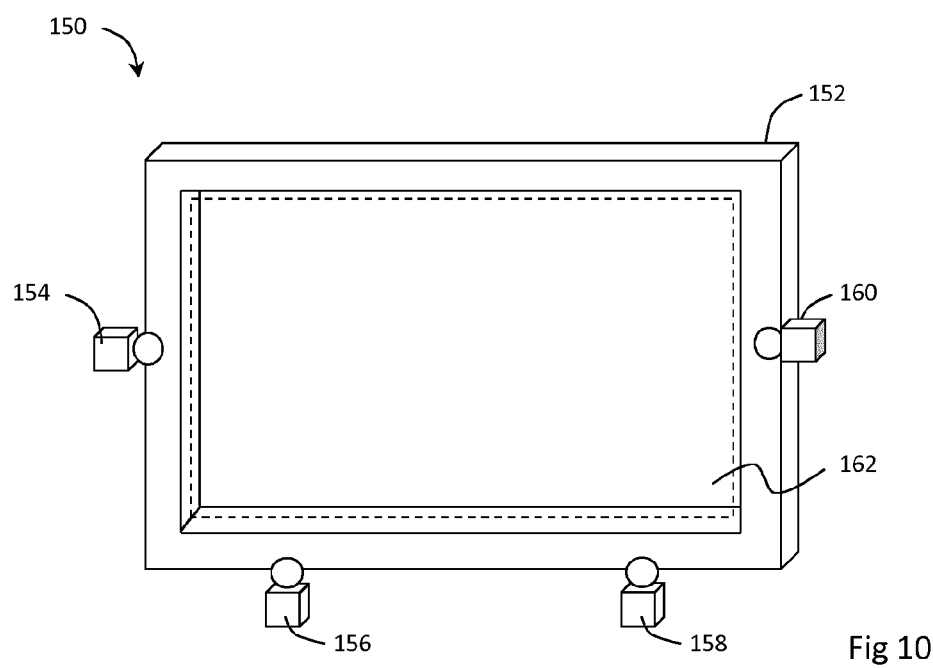
FIG. 10 is a device according to an embodiment of the disclosure.

FIGS. 9 and 10 illustrate devices according to two different embodiments of the present disclosure. FIG. 9 illustrates a device 130 comprising a display 132 having a viewing surface 134 and four cameras 136, 138, 140 and 142. The cameras are attached to the display in the manner and orientations as described above with reference to FIGS. 1 and 3.

The viewing surface 134 of the display 132 defines a plane and it is to be realized that the discussion above of the orientation of the cameras of FIGS. 1 and 3 relative to the viewing surface of the display apply equally with respect to the plane defined by the viewing surface.

FIG. 10 illustrates a device 150 according to a further embodiment of the present disclosure. The device 150 includes a frame 152 and four cameras 154, 156, 158 and 160. The frame 152 is made to fit around a display such as the display 10 discussed above and illustrated in FIG. 1. The frame 152 defines a plane 162 which coincides with the viewing surface of a display when the frame has been installed on the display. The cameras 154, 156, 158 and 160 are mounted on the frame 152 so that, once the frame is installed on a display, the cameras 154, 156, 158 and 160 are oriented relative to the plane 162 (and therefore relative to the viewing surface of the display) in the same manner as described with reference to FIGS. 1 and 3.

It is to be realized that the discussion above with reference to FIGS. 1 to 8 apply to both of the embodiments of FIGS. 9 and 10.

Figure 11:
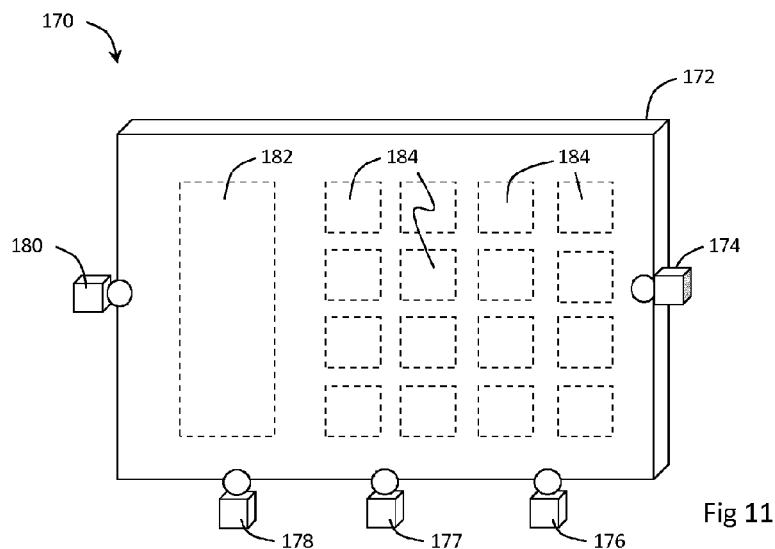
FIG. 11 is a device according to an embodiment of the disclosure.

FIG. 11 illustrates a portion of a device 170 according to a further embodiment of the present disclosure. The device 170 comprises a display 172 with cameras 174, 176, 177, 178 and 180 attached to the display in the manner described above. In this embodiment however, the display is divided up into a slide area 182 and virtual buttons 184. In this embodiment, the vertical camera 178 is used to determine and recognize user's slide gestures in the slide area and cameras 176 and 177 are used to determine select gestures corresponding to the virtual buttons 184 in the manner described above.

In the embodiments illustrated, cameras are arranged relative to a display so that there are two cameras with horizontal fields of view towards one another, but only a single camera for respective vertical positions (e.g., cameras 138 and 140 of FIG. 9 do not have opposing cameras facing towards them, but camera 136 faces camera 142).

In the embodiments illustrated, this is possible, since the cameras are paired according to their location. Therefore, once the X co-ordinate is known, it is known which horizontal camera will be required. However it is to be realized that the provision of two horizontally orientated cameras can be advantageous. The previously described step of qualifying pixels according to HSV eliminates many movements not attributable to a user's gesture. However, where a detected movement is attributable to a user, and specifically to a user's head having the same HSV as their hand, the detection of this movement cannot be discounted in this manner. In such cases, embodiments of the present disclosure advantageously refer to the image captured by both horizontally orientated cameras. This cross referencing allows any movement not taking place in front of the display to be eliminated.

However, it has been found that the overlap of the fields of view of the vertically orientated cameras (e.g., 138 and 140 of FIG. 9) is less useful. In the embodiments illustrated, a calculation is applied to exclude the overlap from the image of one of these cameras to exclude duplication of information when the initial X co-ordinate calculation is made.

A further embodiment of the present disclosure extends to a device and method as before described, but where the display is omitted. Such an embodiment may, for example be used with a virtual reality headset. In this embodiment, the gesture regions are defined in a space in which the user will then gesture and these gestures are interpreted as input to the computing device.

It is to be realized that the above discussions apply equally to this embodiment, with the exception that the orientation of the cameras is not constrained with respect to the viewing surface of a display. However, in this embodiment, the cameras are orientated substantially orthogonally to one another, and the aforementioned horizontal and vertical orientations apply relative to the camera orientations, and not the display.

Figure 12:
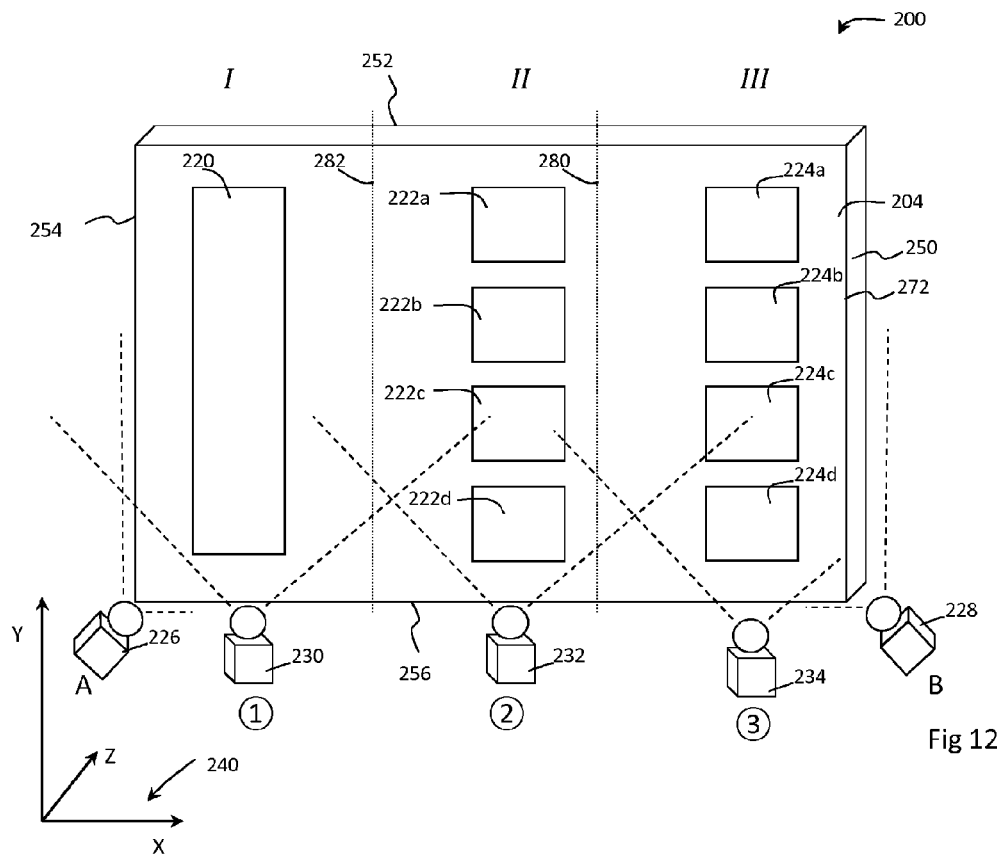
FIG. 12 illustrates a portion of a device according to a further embodiment of the disclosure.

FIG. 12 illustrates a device 200 comprising a display 250 and five cameras 226, 228, 230, 232 and 234. Each of the cameras are shown with their field of views illustrated in dashed outline. Similar to the displays of the devices referred to above, the display 250 is rectangular in shape and has four edges 250, 272, 254 and 256. Display 250 has a viewing surface 204 which forms the viewing surface when the display is in use. In the embodiment illustrated, the display 204 is a monitor of the type used with personal computers, but a projector and screen may be used with alternate embodiments of the present disclosure.

Cameras 226 and 228 are situated at adjacent corners of the display 250. Cameras 230, 232 and 234 are situated on edge 256, being the edge between the adjacent corners at which cameras 226 and 228 are situated. Advantageously, the cameras 226 and 228 are situated at adjacent corners. This allows for a reduced number of cameras (in this embodiment, two cameras) to be used whilst still maintaining a reasonable coverage of the surface of the display.

In this embodiment, the cameras 226, 228, 230, 232 and 234 are orientated with their fields of view adjacent to the viewing surface 204 in a manner similar to that described above and illustrated in FIGS. 2 and 3.

In the embodiment illustrated, there are three cameras located on the edge between the adjacent corners. However, it is to be realized that embodiments of the present disclosure may operate with fewer, or with more, cameras located on this edge.

Cameras 226 and 228 are commercially available cameras which operate in the visual range of the electromagnetic spectrum. In this embodiment, the field of view of these cameras is 90°. Since these cameras are located at the corners of the display, it is to be realized that a field of view of (or close to) 90° is advantageous since it allows the camera to view the entire display surface.

The display is divided into different virtual gesture regions, 220; 222a, 222b, 222c and 222d; and 224a, 224b, 224c and 224d. Region 220 is used to recognize swipe gestures whereas the other regions are used to recognize select gestures. These regions are virtual in the sense that the locations relative to the screen have been stipulated in software although the display may show visual clues to the user to help the user locate the specific regions.

It is to be realized that the type and number of regions may be altered according to the use to which the embodiment is put. Furthermore, regions are not necessary; embodiments of the present disclosure may recognize the gestures anywhere on the screen, if desired.

A set of co-ordinate axes 240 showing X, Y and Z axes is also illustrated in FIG. 12. To facilitate the discussion below, the display has been given column designations: region 220 forms column I; regions 222a, 222b, 222c and 222d form column II; and 224a, 224b, 224c and 224d form column III.

In this embodiment, the cameras 230, 232 and 234 are located and orientated so that they each cover a respective column of the display.

The manner in which the display 250 and five cameras 226, 228, 230, 232 and 234 operate is now described. It is to be realized that the display 250 and five cameras 226, 228, 230, 232 and 234 are connected to a computing device comprising a processor and memory in the same manner as described above in relation to display 10 and as illustrated in FIG. 4.

Figure 13:
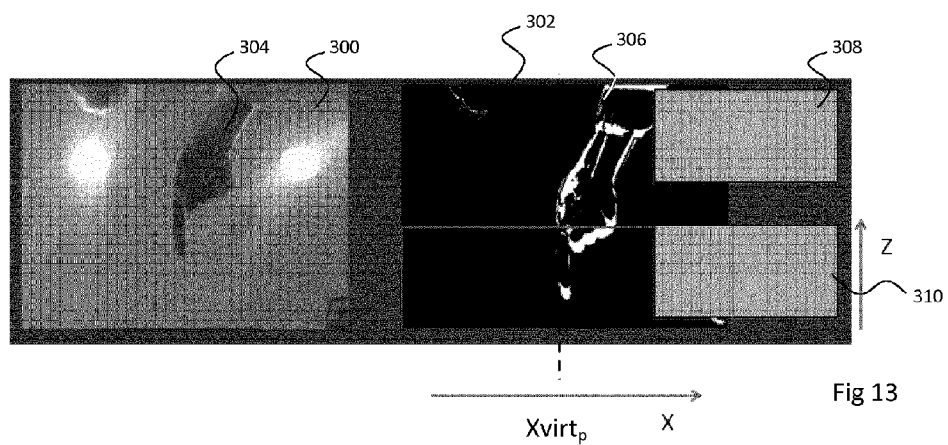
FIGS. 13 and 14 are images captured by respective cameras with overlays.
Figure 14:
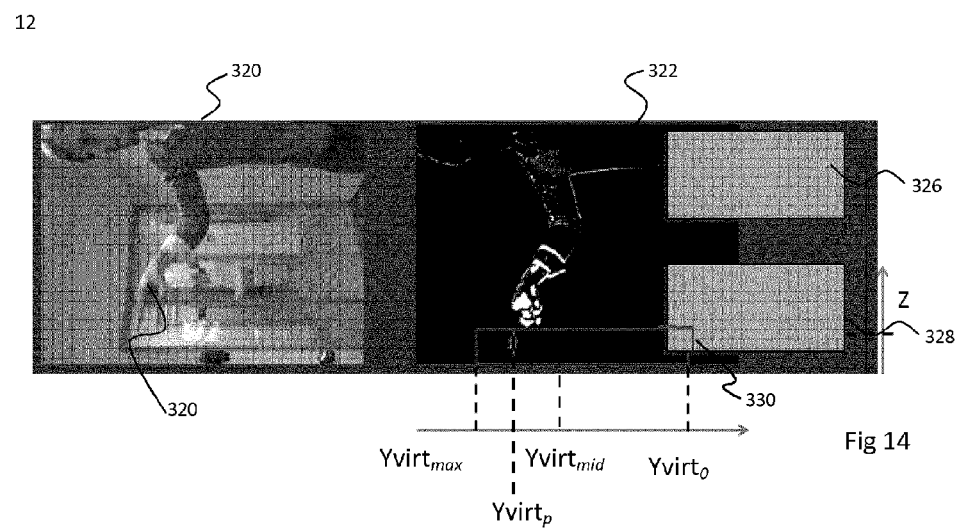

FIGS. 13 and 14 are images captured by respective cameras with overlays.

FIG. 13 illustrates an image 300 captured by camera 230. In the co-ordinate system 240 of FIG. 11, the image is a view along the Y-axis. As shown, a user's hand 304 with a finger extended as a gesture is captured in the image 300.

Also illustrated in FIG. 13 is representation 302 showing the results of obtaining a difference image between two images such as image 300 taken at different times. Rectangle 308 defines a gesture region which is a portion of the field of view of the camera which is designated as the area in which gestures are recognized. In other words, the calculations as described herein are only carried out for the image defined in the gesture region 308. Therefore, it is not necessary for the computing device to carry out calculations for all of the information in the image. Making calculations for such a reduced area provides significant advantages in terms of processing speed over an implementation where the entire image is to be processed.

Also illustrated in FIG. 13 are predetermined depth indicators 308 and 310.

FIG. 14 illustrates an image 320 captured by camera 226. The image 320 corresponds to the same scene as image 300 and, as shown, the user's hand 304 with extended finger is also visible in image 320. Also shown in FIG. 14 is representation 322 showing a difference between successive images such as image 320.

Predetermined depth indicators 326 and 328 correspond to predetermined depth indicators 308 and 310 of FIG. 13.

Figure 15:
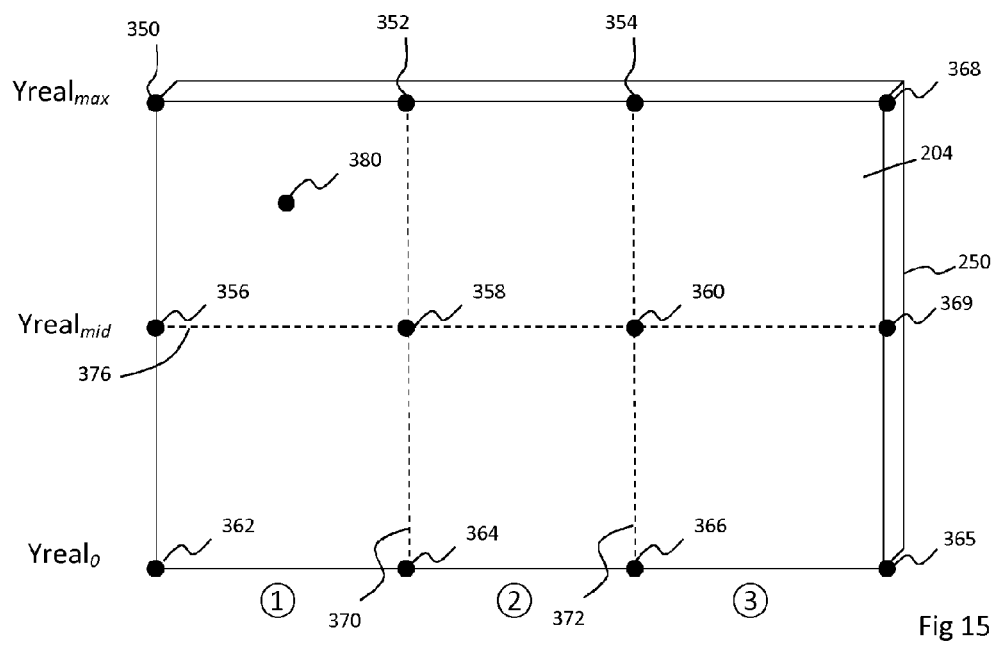
FIG. 15 illustrates the display of FIG. 11 divided according to areas during a calibration phase.

FIG. 15 illustrates the viewing surface 204 of display 250 of FIG. 11 divided according to areas during a calibration phase. The viewing surface is divided into separate regions by vertical lines 370 and 372, and horizontal line 376. The three vertical columns created by vertical lines 370 and 372 corresponding to the edge cameras 230, 232 and 234 illustrated in FIG. 12. For the ease of reference, cameras 230, 232 and 234 have also been designated 1, 2 and 3 as illustrated by the numerals in circles in FIGS. 12 and 15. Horizontal line 376 divides the viewing area 250 into an upper half and a lower half. With reference to FIG. 12, the co-ordinate system 240 applies equally to FIG. 12 so that horizontal line 376 divides the viewing area 204 along the Y co-ordinate. Since we are here concerned with determining the location of a gesture denoted by a user's appendage relative to the viewing area 204 (as illustrated in FIGS. 13 and 14), the co-ordinates of the viewing area 204 of FIG. 15 have been designated as "real." Therefore, the top of the viewing area 204 corresponds to $Yreal_{max}$; the mid-way point denoted by line 376 corresponds to $Yreal_{mid}$ and the minimum corresponds to $Yreal_0$.

Due to the orientation of the edge cameras 230, 232 and 234, the X co-ordinate of the user's appendage can be easily determined once the position of the appendage is known. However, it is more difficult to determine the Y co-ordinate since there is a significant distortion in the geometry of the viewing surface 204 when viewed through the corner cameras 226 and 228.

It is therefore necessary to apply a mapping between the image detected by the corner cameras 226 and 228 and the co-ordinate system of the viewing surface 204.

The true mapping between the images captured by the corner cameras and the viewing surface is a complex relation which either depends on knowing the correlation between the images and the co-ordinates precisely or setting up the corner cameras so that the exact angle of orientation is known. However, since the cameras of embodiments of the present disclosure may be fitted to existing displays, it is difficult and expensive to establish the precise orientation of the cameras relative to the viewing surface for each installation.

Instead, it has been realized that a fair approximation of the mapping required can be obtained if the viewing area is divided into sub-regions and a mapping for each sub-region and each camera combination is established during a calibration phase, and that this mapping is then applied to a recognized gesture. This is particularly useful when determining the Y co-ordinate for the gesture in the device 200 illustrated in FIGS. 12 to 15, but may equally apply to any situation where there is a distortion between the image and the actual location of an object identified in the image.

As mentioned, the co-ordinates of the viewing surface 204 of the display are here designated the "real" co-ordinates. Similarly, the location of an object in the distorted view of corner cameras 226 and 228 is here designated the "virtual" co-ordinates. In this embodiment, this applies to the Y co-ordinate. Therefore, as illustrated in FIG. 14, the height of the display 250 corresponds to the box 330 shown in FIG. 14. The top of the display 250 which is co-ordinate $Yreal_{max}$ in FIG. 12 corresponds to $Yvirt_{max}$ in FIG. 14. Similarly $Yreal_{mid}$ in FIG. 12 corresponds to $Yvirt_{mid}$ in FIG. 14, and $Yreal_0$ in FIG. 12 corresponds to $Yvirt_0$ in FIG. 14.

The process whereby this realization is used during calibration, and then during measurement, is described below with reference to FIGS. 16 and 17.

Figure 16:
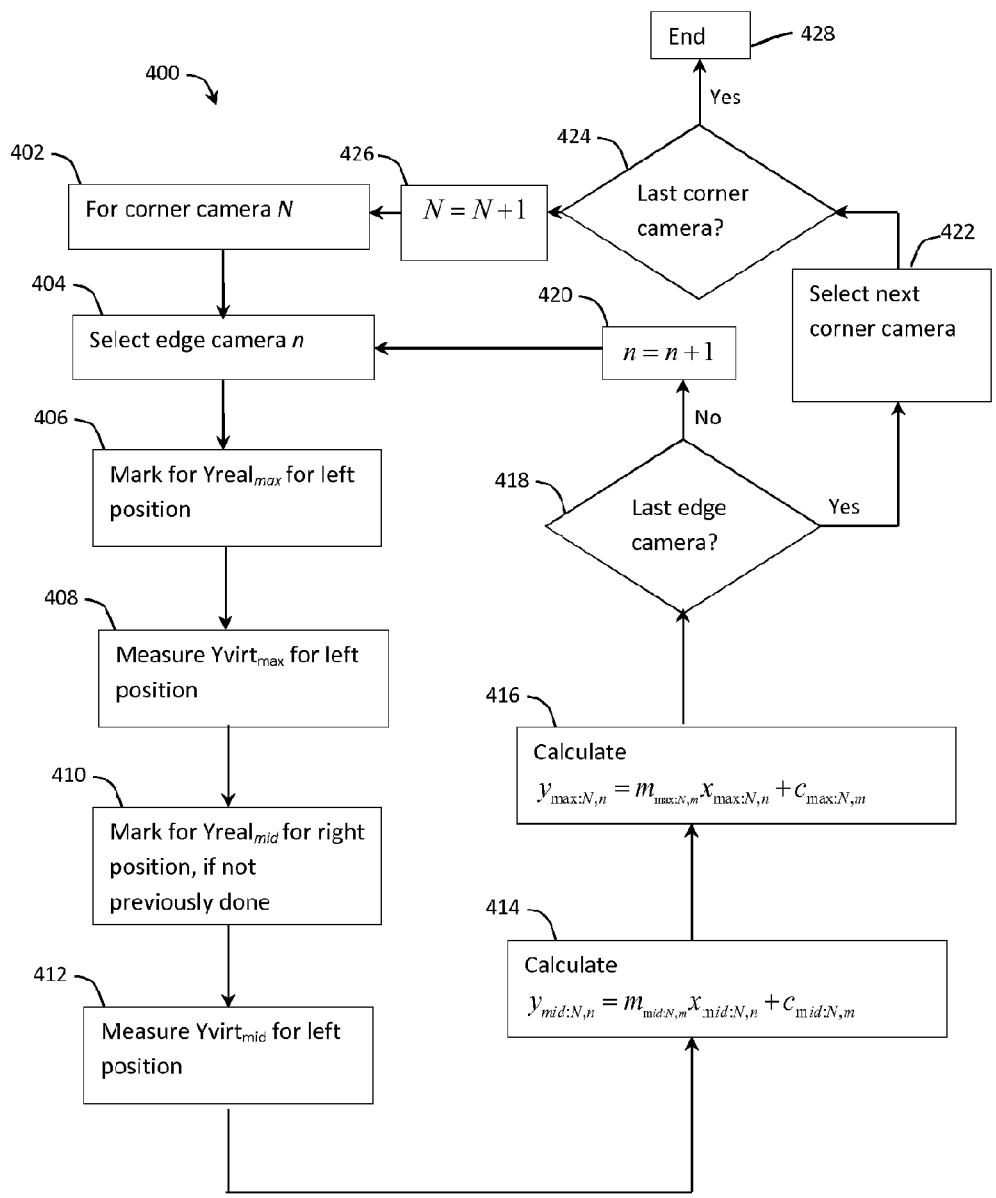
FIG. 16 is a process diagram illustrating a calibration of the device of FIG. 11.

FIG. 16 illustrates a method 400 used during the calibration step. Since the mapping to be applied will differ for each of the corner cameras, in the initial step, step 402 the first corner camera is selected. In the embodiment of FIG. 12, this is camera 226. In the following step, step 404 the edge camera is selected. For this part of the calibration method this will be the first edge camera, camera 230. The following steps are therefore carried out for the particular edge and corner camera combination selected.

In step 406, the maximum left of the viewing surface 204 is marked (point 350 in FIG. 15 corresponding to $Yreal_{max}$). In step 408 the corresponding position recorded by corner camera 226 is noted. This provides the co-ordinate $Yvirt_{max}$ for this left-hand side for the edge camera 230.

In the following step, step 410 the maximum right of the viewing surface 204 is marked (point 352 in FIG. 15). In step 412 the corresponding position recorded by corner camera 226 is noted. This provides the co-ordinate $Yvirt_{max}$ for this right-hand side for the edge camera 230.

In steps 410 and 412, the mid-points (corresponding to $Yvirt_{mid}$) are determined for the left and right sides of edge camera 1 (230), corresponding to $Yreal_{mid}$ for points 356 and 358 on FIG. 15.

With the use of the position of the four points determined in steps 406 to 412 a linear mapping between the real and virtual positions is determined. This linear mapping comprises the form:

$$y=mx+c.$$

Since there will be different mapping for the maximum values and the mid values two linear equations are established in corresponding steps 414 and 416:

$$y_{mid:N,n}=m_{mid:N,n}x_{mid:N,n}+c_{mid:N,m}; \text{ and}$$

$$y_{max:N,n}=m_{max:N,n}x_{max:N,n}+c_{max:N,m}$$

where N is the corner camera selected in step 402 and n is the edge camera selected in step 404.

Once the two mapping equations above are established, the method proceeds to step 418 where a determination is made whether there are remaining edge cameras for the corner camera under consideration. At the point of the process being considered here, the next edge camera is camera 2 (232) and this camera would be selected at step 420. Since the right-hand positions for camera 1 (230) are the left-hand positions for camera 2 (232), it is not necessary to repeat steps 406 and 408 for this camera. Steps 410, 412, 414 and 416 are repeated to establish two linear equations for this camera too.

Similarly, this part of the process will be repeated for camera 3 (234).

Once this process has been completed for all the edge cameras, it is determined at step 418 that there are no further edge cameras and the process proceeds to step 422 where it is determined whether there are remaining corner cameras to be processed. At the point of the process currently under consideration, the next corner camera is camera 228 which is then selected at step 426. The process of steps 404 to 420 are then repeated for each of the edge cameras.

Once all the corner cameras and all the edge cameras have been considered, the process will end at step 428.

In this manner, considering that there are two corner cameras and three edge cameras in the embodiment illustrated, there will be twelve linear equations established for the various camera combinations and sub-regions.

In the process discussed, no determination for the minimum values ($Yreal_0$ and $Yvirt_0$) is carried out since, as shown below, it is possible to determine the desired measurement without these values. However, it is to be realized that the method described is not limited to the number of cameras shown or the division of the viewing area into the number of sub-regions discussed here. Further cameras and sub-regions may be used depending on the size of the display, the resolutions of the cameras, desired accuracy, etc.

Figure 17:
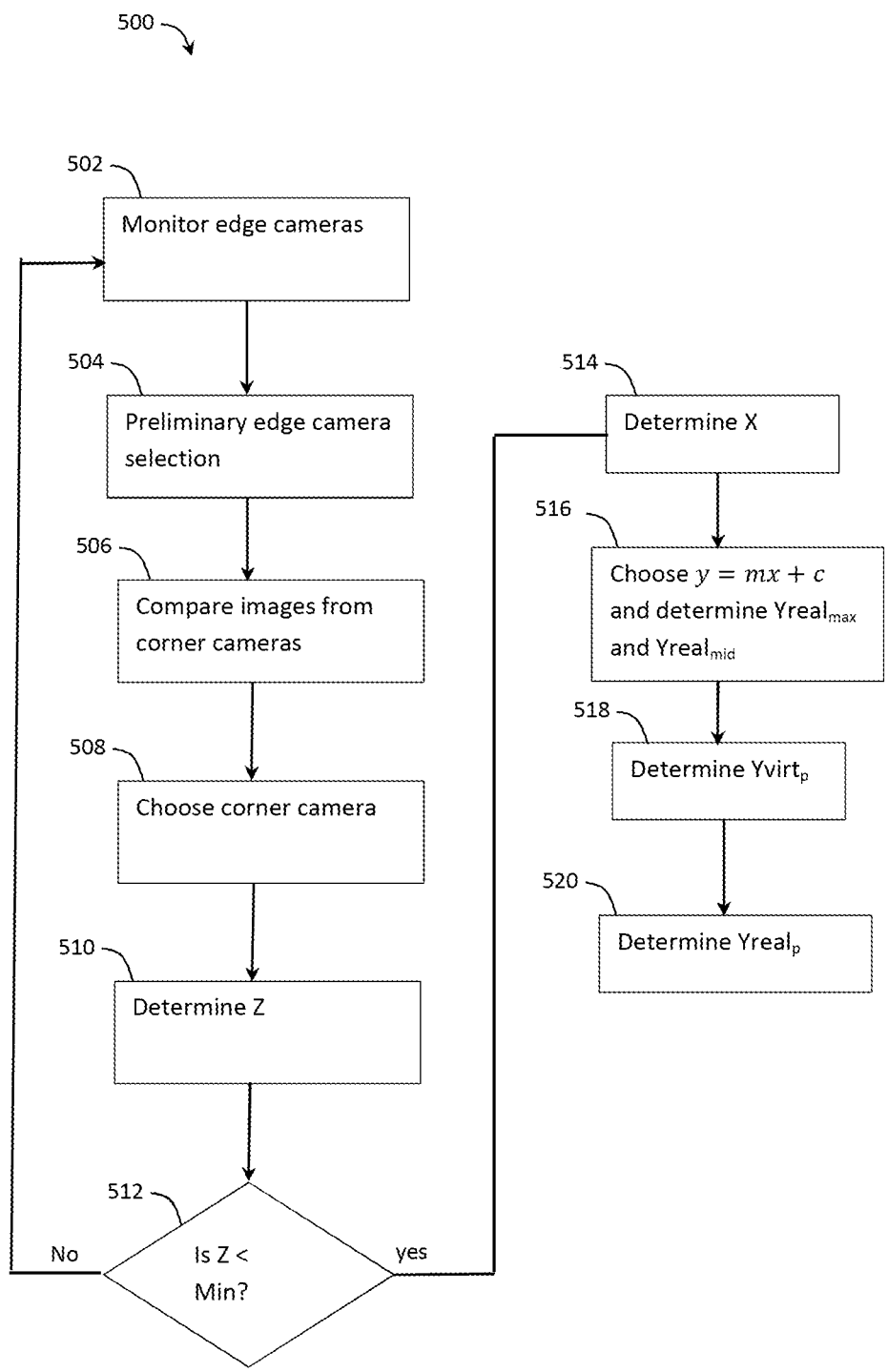
FIG. 17 is a process diagram of a method for use in recognizing a gesture with the device of FIG. 11.

FIG. 17 illustrates the process 500 carried out when a gesture is recognized. In the preliminary step, step 502, the edge cameras 230, 232 and 234 are monitored. For each camera, difference images are produced and resulting pixels monitored, as described above with reference to FIG. 7. When it is determined that a collection of pixels pass a predetermined threshold (in this case, the average position extends past the line denoted by the predetermined depth indicator 308 illustrated in FIG. 13), the process moves on to the next step.

At the following step, step 504 a preliminary edge camera selection is made corresponding to the camera for which the predetermined threshold has been met. It is to be realized that the steps 502 and 504 are carried out continuously so that the remainder of the process described below may be interrupted at any point by the designation of a new edge camera. This helps to avoid false positive readings.

At step 506, images produced by both corner cameras 226 and 228 are compared by calculating and comparing the standard deviation of pixel information in the images captured by both cameras. In the following step, step 508, the camera corresponding to the image having the smallest standard deviation is chosen as the camera to use for the following steps. The advantage of this is that noise (which may, for example, be produced by a person standing next to the display 250 in the field of view of one of the corner cameras) produces a larger standard deviation of the information across the image. Therefore, by selecting the image with the smaller standard deviation, the camera with the lesser noise present is more often selected. This results in more accurate determinations of gestures.

At the following step, step 510, a determination of the Z co-ordinate is made by calculating the distance between the nearest pixel and the bottom of the image of FIG. 13. This corresponds to the distance between the user's appendage and the viewing surface of the display. In step 512, it is determined whether the Z co-ordinate corresponds to a predetermined minimum. In the embodiment illustrated the predetermined minimum is the top of the rectangle 310 illustrated in FIG. 13.

If the Z co-ordinate is not less than the predetermined minimum, the process returns to step 504. If the predetermined minimum is met, the process proceeds to step 514 where the X co-ordinate is determined by measuring the position of the pixels as recorded by the edge camera. For example, with reference to FIG. 15, if a user's appendage is located at the point 380, this corresponds to an X co-ordinate of $Xvirt_p$ as illustrated in FIG. 13. As previously described, this X co-ordinate will correspond to the actual location of the user's appendage on the viewing surface, provided that if the edge camera used is not located at the edge considered the origin of the X-axis an off-set corresponding to the position of the camera used for the measurement will have to be applied.

At the following step, step 516, the linear mapping for the particular sub-regions for $Yvirt_{max}$ and $Yvirt_{mid}$ are chosen, and $Yreal_{max}$ and $Yreal_{mid}$ are determined from this for the known X co-ordinate.

For step 518, the virtual Y co-ordinate $Yvirt_p$ is determined by measurement from the difference image produced by the chosen corner camera in the same manner as the determination of the virtual X co-ordinate.

At the final step, Yreal is determined by using the relative proportions of $Yvirt_p$ to $Yvirt_{max}$ and $Yvirt_{mid}$ are made. The following equation can be used:

$$\frac{Yreal_{max} - Yreal_p}{Yreal_{max} - Yreal_{mid}} = \frac{Yreal_{max} - Yvirt_p}{Yvirt_{max} - Yvirt_{mid}}$$

Finally, if required, any offset can be applied, if needed. Furthermore a number of determined positions can be accumulated to represent a gesture such as a swipe.

Once the position of the user's appendage relative to the viewing surface is known, known methods may be used to interpret this as input to the computing device. For example, a pointing gesture could be interpreted as a select command and a sliding gesture (which would involve determining the change in the position of the appendage over time) could be interpreted as a scroll command. By designating different virtual areas of the viewing surface of the display for different types of gestures, the interpretation can be significantly simplified.

The invention claimed is:

1. A method of providing input to a computing device, the computing device comprising a processor, memory, a display having a viewing surface and at least three cameras having respective fields of view, the method comprising the steps of:
    capturing corresponding images with the cameras;
    identifying input gestures using the captured images, wherein the input gestures are spaced from the viewing surface of the display, and wherein said identifying input gestures includes processing each image by designating a region of the image as a gesture region and determining changes in the gesture region, wherein the gesture regions are spaced from the viewing surface of the display; and
    interpreting the identified input gestures as input to the computing device;
    wherein at least one of the cameras is orientated such that the respective field of view lies adjacent to the viewing surface of the display;
    wherein said identifying input gestures in the captured images comprises first choosing between images captured by either a first camera or a second camera of the at least three cameras and then using the chosen images to identify the input gestures,
    wherein said identifying input gestures in the captured images is further based on images captured by a third camera of the at least three cameras,
    wherein said choosing between images captured by either the first camera or the second camera comprises comparing image information between images captured by the first camera and images captured by the second camera, and
    wherein said comparing image information comprises comparing a standard deviation of information contained in an image captured by the first camera to a standard deviation of information contained in an image captured by the second camera,
    wherein each of said at least three cameras operates to capture only two-dimensional image information.

2. The method according to claim 1 wherein a determination of a first dimension for use in identifying input gestures is based on images captured by the third camera.

3. The method according to claim 2 wherein an input gesture is recognized by determining a change in images captured by the first camera at different times and calculating a threshold based on the change.

4. The method according to claim 2 where a determination of a second dimension for use in identifying input gestures is based on images captured by the first camera or the second camera.

5. The method according to claim 4 wherein an input gesture is performed by a user's appendage and wherein the step of determining the second dimension of the input gesture comprises recognizing the user's appendage.

6. The method according to claim 5 wherein the user's appendage is recognized according to a predetermined range of hue, saturation and value of pixels in images captured by the second camera.

7. The method according to claim 4, further comprising establishing a mapping between a co-ordinate system of the first camera and/or the second camera and a co-ordinate system of the viewing surface.

8. The method according to claim 7 wherein the mapping comprises a linear mapping.

9. The method according to claim 8 wherein the mapping comprises a first linear mapping applied to a first section of the co-ordinates of the viewing surface and a second linear mapping applied to a second section of the viewing surface.

10. The method according to claim 1, further comprising tracking an input gesture and determining a slide action in dependence on detected motion of the input gesture.

11. The method according to claim 1 wherein all of the cameras are situated near an edge of the display and orientated with intersecting fields of view.

12. The method according to claim 1 wherein the computing device further comprises a fourth camera which is positioned adjacent the third camera and wherein a determination of a first dimension comprises choosing between images captured by the third camera and images captured by the fourth camera.

13. A device for providing input to a computing device, the computing device comprising a processor and memory, the device comprising:
    a rectangular display having a viewing surface; and
    at least three cameras having respective fields of view, each of the cameras capturing information in two spatial dimensions only,
    wherein a first camera and a second camera of the at least three cameras are located at respective adjacent corners of the display, and a third camera of the at least three cameras is located at an edge of the display between the first and second cameras,
    wherein each camera is orientated to capture image information of a gesture region spaced from the viewing surface of the display to thereby recognize gestures in the gesture region from said image information,
    wherein the processor is configured to recognized the gestures in the gesture region by first choosing between images captured by either the first camera or the second camera of the at least three cameras and then using the chosen images together with images captured by the third camera of the at least three cameras to recognize the gestures,
    wherein said choosing between images captured by either the first camera or the second camera comprises comparing image information between images captured by the first camera and images captured by the second camera,
    wherein said comparing image information comprises comparing a standard deviation of information contained in an image captured by the first camera to a standard deviation of information contained in an image captured by the second camera, and wherein each of said first, second and third cameras operates to capture only two-dimensional image information.

14. The device according to claim 13, further comprising a fourth camera located at an edge of the display between the first and second cameras.

15. The device according to claim 14, further comprising a mounting frame located at a periphery of the display, wherein at least said first and second camera are mounted to the mounting frame.

16. The device according to claim 15 wherein each camera is mounted to the mounting frame.

17. The device according to claim 14 wherein at least one of the cameras is orientated such that the respective field of view lies adjacent to the viewing surface of the display.

18. The device according to claim 14 wherein the input comprises an input gesture and wherein the memory stores instructions which, when processed by the processor, identify input gestures using the captured images, wherein identifying input gestures in the captured images comprises choosing between images captured by either the first camera or the second camera and further using the chosen image to identify input gestures.

19. The device according to claim 18 wherein identifying input gestures in the captured images is further based on images captured by the third camera.

20. The device according to claim 18 wherein choosing between images captured by either the first camera or the second camera comprises comparing information between images captured by the first camera and images captured by the second camera.

21. The device according to claim 20 wherein the input gesture is performed by a user's appendage and wherein the instructions further comprise instructions for recognizing the user's appendage.

22. The device according to claim 21 wherein the user's appendage is recognized according to a predetermined range of hue, saturation and value of pixels in images captured by one or more of the cameras.

23. The device according to claim 18 wherein the instructions, when processed by the processor, determine a first dimension for use in identifying input gestures based on images captured by the third camera and determine a second dimension for use in identifying input gestures based on images captured by the first camera or the second camera, wherein the input gesture is performed by a user's appendage, wherein the step of determining the second dimension of the input gesture comprises recognizing the user's appendage, and wherein the user's appendage is recognized according to a predetermined range of hue, saturation and value of pixels in images captured by the second camera.

24. The device according to claim 14 wherein at least one of the cameras is orientated so that the respective field of view lies adjacent to the viewing surface of the display.

25. The device according to claim 14 wherein all of the cameras are situated near an edge of the display and orientated with intersecting fields of view.

26. The device according to claim 18 wherein the instructions, when processed by the processor, process each image by designating a region of the image as a gesture region and determining changes in the gesture region.

27. The device according to claim 26 wherein the instructions, when processed by the processor, further define respective gesture regions adjacent to the viewing surface of the display.

28. The device according to claim 26 wherein the instructions, when processed by the processor, further define respective gesture regions spaced from the viewing surface of the display.

* * * * *